United States Patent
Cornils et al.

(10) Patent No.: US 6,722,731 B2
(45) Date of Patent: Apr. 20, 2004

(54) ASSEMBLY OF A VEHICLE WINDOW GLASS WITH A CONTIGUOUS ELEMENT

(75) Inventors: Gerd Cornils, Merzenich-Ginbelsrath (DE); Florian Fischer, Aachen (DE); Ulrich Behrend, Stolberg (DE); Thomas Orten, Roetgen (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/176,317

(22) Filed: Jun. 21, 2002

(65) Prior Publication Data

US 2003/0006623 A1 Jan. 9, 2003

Related U.S. Application Data

(63) Continuation of application No. PCT/FR00/03656, filed on Dec. 21, 2000.

(30) Foreign Application Priority Data

Dec. 21, 1999  (DE) ..................................... 199 61 706

(51) Int. Cl.$^7$ ................................................. B60J 1/02
(52) U.S. Cl. ............... 296/201; 296/146.15; 296/96.21; 52/208
(58) Field of Search ........................ 296/201, 190.01, 296/192, 146.15, 84.1, 96.21; 52/208

(56) References Cited

U.S. PATENT DOCUMENTS

| | | | |
|---|---|---|---|
| 4,584,155 A | | 4/1986 | Zanella |
| 4,938,526 A | * | 7/1990 | Sannomiya et al. ......... 296/192 |
| 5,001,876 A | * | 3/1991 | Harper et al. .................. 52/208 |
| 5,396,746 A | * | 3/1995 | Whitmer ...................... 296/201 |
| 5,421,940 A | | 6/1995 | Cornils et al. |
| 5,507,994 A | | 4/1996 | Cornils et al. |
| 5,522,636 A | * | 6/1996 | Kolar, Jr. ................ 296/146.15 |
| 5,584,526 A | * | 12/1996 | Soldner .................. 296/146.15 |
| 5,603,546 A | * | 2/1997 | Desir, Sr. ................ 296/146.15 |
| 5,692,953 A | * | 12/1997 | Bell et al. ...................... 296/192 |
| 5,711,119 A | * | 1/1998 | Cornils et al. ............... 296/201 |
| 5,935,356 A | | 8/1999 | Soldner |
| 5,988,730 A | * | 11/1999 | Bekaert .................. 296/146.15 |
| 6,039,907 A | | 3/2000 | Krumm et al. |
| 6,158,372 A | * | 12/2000 | Erskine .................. 296/146.15 |
| RE37,395 E | * | 10/2001 | Kunert et al. ................ 296/201 |
| 347,491 A1 | * | 2/2002 | Legrand ...................... 296/201 |

FOREIGN PATENT DOCUMENTS

| | | |
|---|---|---|
| DE | 87 07 322.6 | 8/1987 |
| DE | 36 06 810 A1 | 9/1987 |
| DE | 37 02 555 A1 | 8/1988 |
| DE | 38 21 457 A1 | 12/1989 |
| DE | 38 43 079 A1 | 7/1990 |
| DE | 42 32 554 C1 | 1/1994 |
| DE | 43 26 650 A1 | 2/1995 |
| DE | 44 45 258 A1 | 6/1996 |
| EP | 0 127 546 A1 | 12/1984 |
| EP | 0 145 443 B1 | 6/1985 |
| EP | 0 163 195 A2 | 12/1985 |
| EP | 0 611 672 A2 | 8/1990 |
| EP | 0 401 091 A1 | 12/1990 |
| EP | 0 490 092 A2 | 6/1992 |
| EP | 0 742 762 B1 | 11/1996 |

* cited by examiner

*Primary Examiner*—D. Glenn Dayoan
*Assistant Examiner*—Greg Blankenship
(74) *Attorney, Agent, or Firm*—Oblon, Spivak, McClelland, Maier & Neustadt, P.C.

(57) ABSTRACT

A device is provided for assembling a fixed-mount vehicle window glass, particularly a windshield, with a component contiguous with one edge of the vehicle window glass, such as a water tray. A profiled part is fixed to the edge of the window glass. The profiled part may be a profiled strip that adheres to the vehicle window glass, and has a lip which joins smoothly and continuously with the free main face of the vehicle window glass. On its underside, the lip may include means of assembly with the component.

21 Claims, 2 Drawing Sheets

ASSEMBLY OF A VEHICLE WINDOW GLASS WITH A CONTIGUOUS ELEMENT

CROSS-REFERENCE TO RELATED APPLICATIONS

This application is a continuation of the U.S. National Stage designation of co-pending International Patent Application PCT/FR00/03656, filed Dec. 21, 2000, which claims priority to German Patent Application No. 199 61 706.6, filed Dec. 21, 1999, the entire contents of which are expressly incorporated herein by reference thereto.

FIELD OF THE INVENTION

The invention relates to a device for assembling a vehicle window glass with a contiguous element.

BACKGROUND OF THE INVENTION

Beautifully finished vehicles are known having a profiled sealing strip covering and sealing a slot between the lower edge of their windshield and an element contiguous therewith.

Document DE 37 02 555 C2 describes a cover plate for covering a region between a bonded windshield and a contiguous part of the bodywork. The cover plate is fixed to the windshield in this instance using a U-shaped rail fixed to an edge of the windshield, and in which the cover plate engages. Because the fixing parts are assembled with the cover plate by a flexible assembly leaf that is able to move over at least one side with respect to their transverse dimension, it is necessary to compensate for any tolerances and expansions of the materials that might exist.

Such U-profile sealing strips are also used, for example, to fix to the windshield a water tray covered by the engine hood and which is used to remove the water that runs off the windshield. The U-profile sealing strip surrounds the lower edge of the window glass on three sides and is fixed by gripping or nesting. Fashioned along its side moving away from the edge of the glass is a longitudinal groove into which an edge of the water tray can be inserted. Aside from the sealed transition between the windshield and the water tray, certain mutual support is also thus afforded. The U-profile sealing strip is made of a relatively hard material, generally rubber or plastic, with steel reinforcements so that it can withstand the high forces exerted when the water tray is fixed to the windshield and when the vehicle is running and causing thermal expansion and vibration. The hard material does, however, have the major disadvantage in that the U-profile sealing strip cannot exactly follow the curved path when being fit to the edge of vehicle window glass that is curved in three dimensions. The U-profile sealing strip instead has a tendency to twist, and its longitudinal groove then moves off its theoretical path so that inserting the edge of the water tray becomes very difficult and the precise fitting of the edge of the water tray along the edge of the window glass is made impossible. Likewise, because of the inevitable variations in the dimensions of the window glasses and bodyworks, it is difficult to always guarantee that the profiled sealing strip, which is a prefabricated molding, will always fit properly on the edge of the window glass, thus resulting in lower holding forces and increased slots and tolerances.

Various methods are known for equipping a window glass with an extruded peripheral profile, which rests against just one main face and against the end face of the window glass (DE 43 26 650 A1, DE 42 32 554 C1). These peripheral profiles can be produced in such a way that they form a continuous surface continuation of the untouched main face of the window glass, situated in the plane of the window glass.

Document DE 43 26 650 A1 discloses a method for manufacturing a window glass provided with an overmolded polymer surround. In this instance, the surround is overmolded over the edge of the window glass, using an extrusion die surrounding the window glass and guided along the edge of the window glass by an automatic manipulator, in such a way that the profiled strip is deposited at least on a main face and on the peripheral face of the window glass. During the extrusion operation, the window glass is held stationary with the aid of a support device corresponding to the shape of the window glass, so that the edge of the window glass protrudes freely beyond the bearing faces of the support device.

Document DE 42 32 554 C1 also describes a relevant method, in which the window glass is placed on a heated molded base which presses against the underside of the window glass in the region of the edge thereof. The molded face forms a continuation of the surface of the window glass, beyond the peripheral face of the window glass. Using a remote automatic manipulator and a heated calibrated extrusion die, a profiled strip is deposited along the edge of the window glass with defined exterior dimensions protruding beyond the peripheral face of the window glass. The profiled strip is made of a thermoplastic polymer and is supplied to the extrusion die by an extruder and a flexible pipe heated under pressure.

In the case of the first mentioned method, the extrusion die forms, with the two main faces of the window glass, a closed die cross section and, in the second method, the closed die cross section is formed by the molded base, the freely accessible surface of the window glass and the extrusion die. The two methods have proved suitable for manufacturing car windows which are designed to be mounted by bonding. A surround with an essentially L-shaped cross section, which is provided with a sealing lip, is extruded over part of the periphery or all of the periphery of the window glass. The first branch of the L-shaped surround covers the surface of the window glass that faces the mounting flange, and the second branch forms the continuation of the peripheral face. The sealing lip can be fashioned with equal ease on either of the branches of the surround.

Such peripheral profiles can also be produced using the widely used injection-molding method as described, for example, in documents EP 0 127 546 A1 and EP 0 145 443 B1. It also has been proposed that peripheral profiles be prefabricated using an injection-molding method and then bonded onto the window glass (EP 0 742 762 B1).

There is a need for an improved device for assembling a fixed-mount vehicle window glass with a component contiguous with one edge of the vehicle window glass, particularly a water tray.

SUMMARY OF THE INVENTION

The invention relates to a device for assembling a fixed-mount vehicle window glass, particularly a windshield, with a component contiguous with one edge of the vehicle window glass, particularly a water tray. In particular, the exterior surface of a profiled part or strip is bonded and adhered to the vehicle window glass with a lip which joins smoothly and continuously with the free exterior main face of the vehicle window glass. At the same time there is provided, on the underside of the lip, means of assembly with another component. Such a configuration with a continuous surface makes it possible, for example, to bring the windshield wipers to their rest position over the water tray without the need for providing expensive devices for raising the wipers and moving them over any protrusions.

Such a profiled strip may be manufactured in a particularly simple way by extruding a polymer, for example, from either polyurethane systems with a moisture-curing component, polyurethane systems based on two components, thermoplastic elastomers or olefins. To extrude a profiled strip that forms a connection of continuous surface, it is possible for example to use a die surrounding the edge of the window glass, and which is configured to delimit, with the window glass, the extrusion cross section. This means that the die, along the two sides of the window glass, needs to have sealing faces which slide along the main faces of the window glass and make a good seal of the cross section of the die with respect to the surfaces of the glass. The surface of the glass, naturally, cannot be damaged by this sliding. This is possible by using appropriate materials for the die and for the sealing faces of the die, respectively.

In order to endow the profiled part with regions that have different properties in a single operation, recourse may be had to the coextrusion method. In this instance, at least two partial profiled strips are combined into a single profiled strip in the extrusion die.

The two partial profiled strips are thus made, for example, of two different plastic materials having different hardnesses. The two partial profiled strips, for example, also may be made of two different plastic materials having different densities. However, it is just as possible for coextrusion to be used to give a profiled strip, made of one single polymer material, a foamy region using a physical or chemical foaming technique. It is thus possible on the one hand, to provide a material of relatively stable shape for that part of the lip which is assembled with another component, while on the other hand, provide the interior face of the profiled strip, which presses against the bodywork, with properties of flexibility and elasticity in order to suppress noise and compensate for tolerances.

Given that vehicle window glasses designed to be bonded into a bodywork opening are often given a sealed surround or covering of extruded polymer, the extrusion method is also recommended for manufacturing the profiled strip intended for the assembly device according to the invention. The materials, the tools and the devices already exist, which means that production can be economical. When the vehicle window glass is equipped with a sealed surround or covering made of extruded polymer and with a profiled part for assembling it with a contiguous component, the profiled part forms a portion of the surround. The profiled part and the surround may be manufactured in a single operation using corresponding extrusion dies, and the transition regions between the start and the end of the extruded profiled strip may be fashioned using known methods (DE 44 45 258 A1).

The profiled part may, however, also be deposited by spraying onto the window glass in a way known per se, by placing the window glass between two half molds, in which molding cavities corresponding to the desired shape or profile are machined, and by filling the cavities, once the half molds have been closed, with a molten thermoplastic polymer or with a reactive polymer system. In the same way, it is also possible to manufacture just the profiled part as an injection-molding and for it then to be bonded afterwards onto the edge of the window glass.

Advantageously, the profiled part is provided, on its face that is facing the bodywork, with a region which rests on and is supported by part of the bodywork. Thus, not only is the stability of the assembly device improved, but the sealing between the vehicle window glass and the bodywork may also be improved. Said region may, for example, be in the form of an elastic bearing lip or a protruding polymer foam elastic bead or profile.

It is often necessary for the component to be demountably assembled with the profiled part so that it may be dismantled. It then becomes possible for assemblies installed under the component, such as a top-up battery or wiper motor, to be serviced or repaired. One demountable assembly often used is the clip-fastened assembly, in which a part with a barbed hook shape, provided with inverse hooks, is introduced into an undercut groove. To dismantle this assembly, significant forces need to be employed or special tools need to be used. Other demountable assembles may be achieved with a hook-type closure or with a deactivatable bonded assembly. The dismantleable assemblies may extend over the entire length of the profiled part parallel to the lower edge of the window glass. However, it is just as possible for the assembly elements to be arranged in several limited areas spaced apart.

Other details and advantages of the subject of the invention will become apparent from the drawings of an exemplary embodiment, with no intention of limiting, and from their detailed description which follows.

BRIEF DESCRIPTION OF THE DRAWINGS

Preferred features of the present invention are disclosed in the accompanying drawings, wherein similar reference characters denote similar elements throughout the several views, and wherein.

DETAILED DESCRIPTION OF PREFERRED EMBODIMENTS

Figure 1:
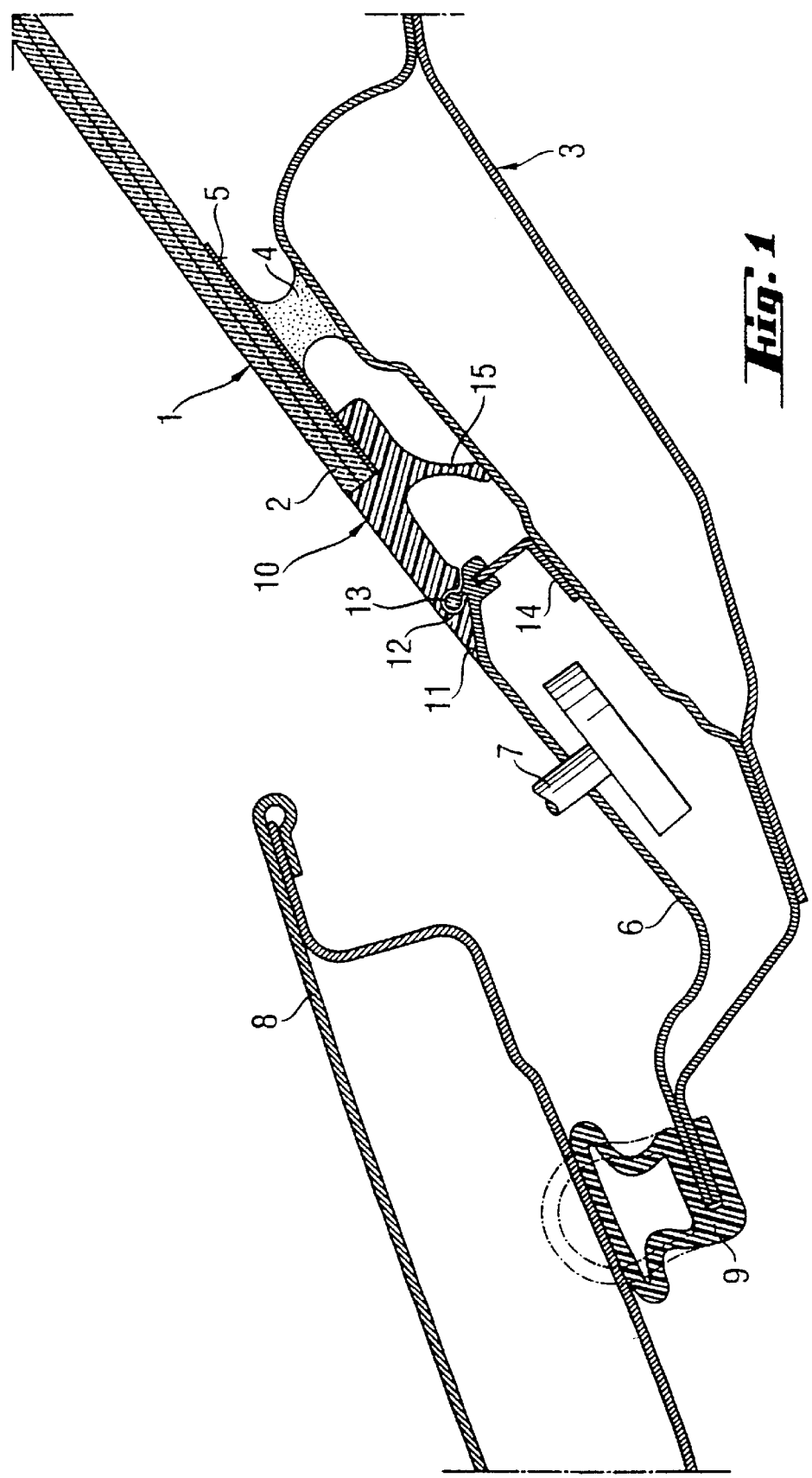
FIG. 1 shows a cross-sectional side view of the transition region between a vehicle windshield and a water tray designed to remove the water.

Turning to FIG. 1, there is shown a laminated glass windshield 1 that is bonded securely, in a manner known per se, by a strip of adhesive 4 to a cross member 3 of a bodywork of a vehicle which is not otherwise depicted, in the region of its lower edge 2. An opaque coating in the form of a surround 5 in enamel conceals the bead of adhesive 4 from view from the outside and protects it from the detrimental effects of ultraviolet radiation.

A water tray 6 is connected to the lower edge 2 of the windshield 1. Its exterior surface, over which water running off windshield 1 is removed, is flush with the exterior surface of windshield 1. By way of indication, a wiper spindle 7 is shown passing through the water tray, and the end of the hood 8, which covers the water tray 6 and the wiper spindle 7. The flow of water from water tray 6 to the engine compartment is prevented by a profiled seal with the customary hollow chamber 9, which is arranged between the underside of the hood and the region of the edge of the water tray 6 that faces toward the hood.

A profiled strip 10 has been extruded in a way known per se on the lower edge 2 of windshield 1 in such a way that it forms a smooth and continuous continuation of the free exterior main face of windshield 1. The extruded material therefore covers only the peripheral face and the interior main face of windshield 1. The exterior main face of windshield 1 is entirely free, the transition from the edge of the glass to the extruded material being completely smooth. A lip 11 is connected to the essentially L-shaped contact cross section of profiled strip 10 and continues as far as the water tray. The surface of the lip is entirely smooth and also forms a smooth transition with the upper face of water tray 6. Fashioned on the underside of lip 11 is a groove 12 in which a rib 13 formed on water tray 6 is housed. On the opposite side of rib 13 to the lip 11 there is a bearing profile 14 which in addition supports water tray 6 on cross member 3. On the underside of profiled strip 10, there is an extruded bearing lip 15 which runs parallel to groove 12 and presses on cross member 3. As a result, on the one hand, the stability of the parts assembled to one another—windshield 1, water tray 6 and cross member 3—is increased and, on the other hand, the sealing of the slot between the glass and the bodywork is improved.

The entire profiled strip 10 is preferably made of a thermoplastic elastomer (TPE) for which the end hardness, 40 to 90 Shore A, is relatively low by comparison with the material of the profiled sealing strip fitted in with a metal reinforcement as mentioned in the introduction. Thus, both assembly of the lip 11 with the water tray 6 in the region of the groove 12, and of the rib 13, is made easier and squealing or knocking noises due to the relative movements between windshield 1 and cross member 3 or water tray 6 are also avoided.

Figure 2:
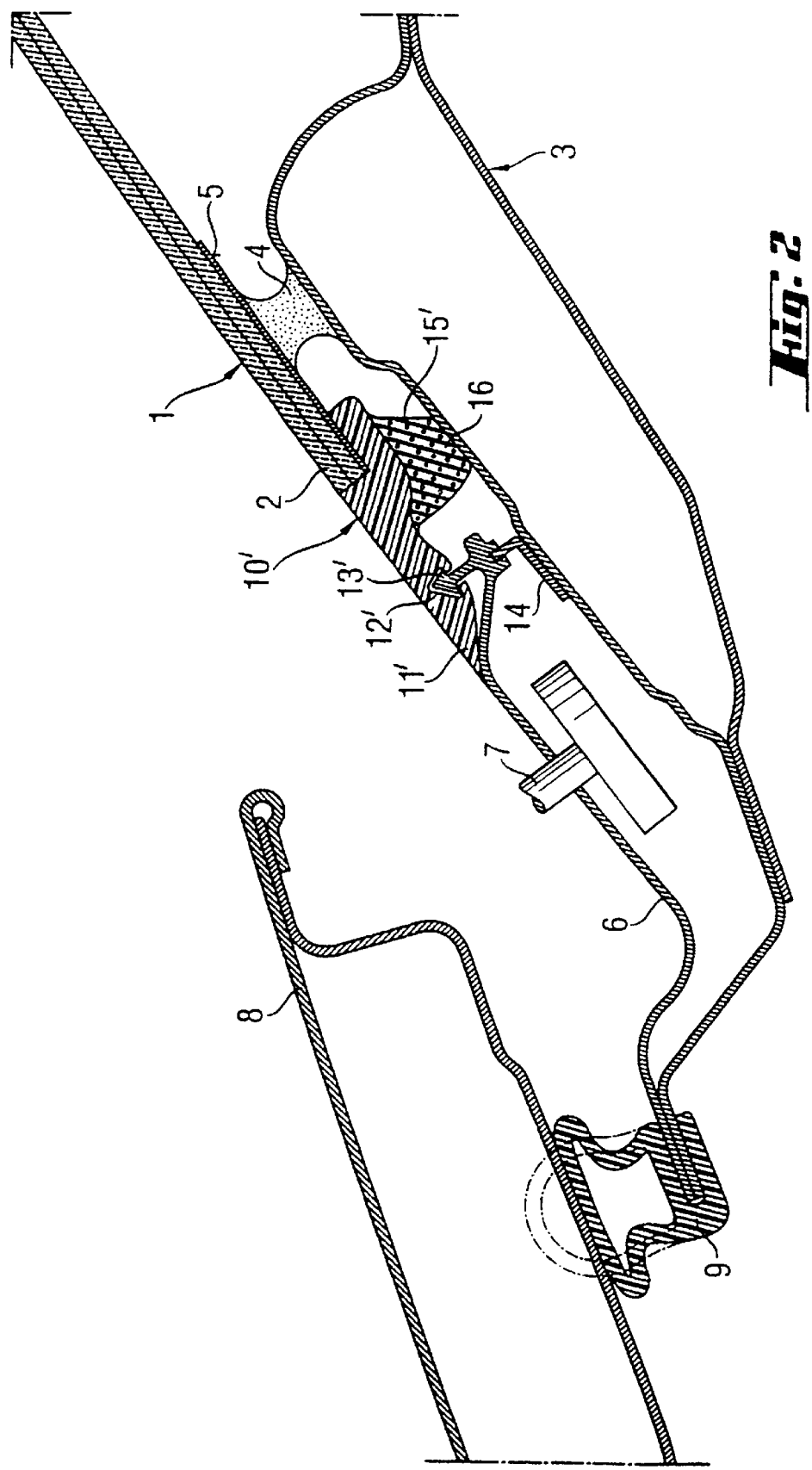
FIG. 2 shows a second embodiment with a coextruded profiled strip and an assembly by clipping to the water tray.

FIG. 2 shows another embodiment of the assembly device described in FIG. 1, for assembly between windshield 1 and water tray 6. A profiled strip 10' which once again forms a smooth and continuous continuation of the exterior main face of windshield 1 has been extruded along the lower edge of windshield 1. Connected to profiled strip 10' is a lip 11' continuing as far as the water tray 6. Fashioned on the underside of lip 11' is an undercut groove 12'; an elongate tenon 13', in the shape of a barbed hook formed on water tray 6, elastically engages undercut groove 12'. The clip-fastened assembly formed by undercut groove 12' and barbed tenon 13' is dismantleable. Coextruded on the underside of profiled strip 10' is a bead of flexible and elastic foam 15' which runs parallel to groove 12' and rests against cross member 3. The cellular structure of bead 15' is obtained during extrusion by the blowing of air, which collects in the polymer in the form of fine bubbles 16. The bead 15' on the one hand increases the stability of the assembled parts with respect to each other, windshield 1, water tray 6 and cross member 3 and, on the other hand, seals the slot between the glass and the bodywork.

It goes without saying that such a device can be used not only for a windshield but also for a backlite, the lower edge of which is placed against a water tray, which is covered by a corresponding trunk lid and which prevents water from entering the trunk. Likewise, such a device is not restricted to a water tray, but also can be used for assembling vehicle window glass with some other component, for example for assembling a side window glass with a door surround cover.

What is claimed is:

1. A device for assembling a fixed-mount vehicle window glass with a component disposed in line with an edge of the vehicle window glass, the device comprising a profiled part fixed to the edge of the window glass, wherein the profiled part comprises a profiled strip with a lip having an underside configured and dimensioned to receive and secure a portion of the component, with the profiled strip adhering to the vehicle window glass and the lip joining smoothly and continuously with (1) a free main face of the vehicle window glass and (2) the component.

2. The device of claim 1, wherein the profiled strip is formed by extrusion.

3. A device for assembling a fixed-mount vehicle window glass with a component disposed in line with an edge of the vehicle window glass, the device comprising a profiled part fixed to the edge of the window glass, wherein the profiled part comprises a profiled strip with a lip having an underside configured and dimensioned to receive a portion of the component, with the profiled strip adhering to the vehicle window glass and joining smoothly and continuously with a free main face thereof;

wherein the profiled strip is formed of at least two coextruded polymers of different hardnesses.

4. A device for assembling a fixed-mount vehicle window glass with a component disposed in line with an edge of the vehicle window glass, the device comprising a profiled part fixed to the edge of the window glass, wherein the profiled part comprises a profiled strip with a lip having an underside configured and dimensioned to receive a portion of the component, with the profiled strip adhering to the vehicle window glass and joining smoothly and continuously with a free main face thereof;

wherein the profiled strip is formed of at least two coextruded polymers of different densities.

5. The device of claim 1, wherein the profiled strip is formed by spray deposition.

6. The device of claim 1, wherein the profiled strip is formed by injection-molding.

7. The device of claim 1, wherein the profiled strip further comprises a bearing lip.

8. The device of claim 7, wherein the bearing lip is elastic.

9. The device of claim 7, wherein the bearing lip is disposed on the underside of the profiled strip.

10. The device of claim 1, wherein the profiled strip comprises a foam.

11. The device of claim 10, wherein the foam forms at least a part of an elastic profile.

12. The device of claim 1, wherein the profiled strip is demountably attachable to the component.

13. The device of claim 12, wherein the profiled scrip is demountably attachable to the component by an undercut groove and an inverse hook that mates therewith.

14. The device of claim 1, wherein the profiled strip is demountably attachable to the component by a hook-type closure.

15. The device of claim 1, wherein the profiled strip and the component are releasably bonded together.

16. The device of claim 1, wherein the component is a water tray.

17. A device for bridging the gap between a vehicle window glass and a component disposed in line with an edge of the vehicle window glass, the device comprising a profiled strip with a lip having an underside configured and dimensioned to secure a portion of the component thereto, with the profiled strip being fixed to the vehicle window glass and the lip joining smoothly and continuously with (1) a free main face of the vehicle window lass and (2) the component.

18. The device of claim 17, wherein the profiled strip is formed by extrusion so that it is fixed to the vehicle window glass and joins smoothly and continuously with a free main face thereof.

19. The device of claim 17, wherein the vehicle window glass comprises an edge surface connecting top and bottom main surfaces, and wherein the profiled strip is formed by extrusion so that it is secured to the edge surface and bottom main surface.

20. The device of claim 17, wherein the profiled strip and component are clipped together.

21. The device of claim 17, wherein the component is a water tray.

* * * * *